United States Patent
Kessler et al.

(10) Patent No.: US 6,497,752 B1
(45) Date of Patent: Dec. 24, 2002

(54) INTEGRALLY ASYMMETRICAL POLYOLEFIN MEMBRANE

(75) Inventors: Erich Kessler, Höchst i. Odw. (DE); Thomas Batzilla, Bürgstadt (DE); Friedbert Wechs, Wörth (DE); Frank Wiese, Wuppertal (DE)

(73) Assignee: Membrana GmbH, Wuppertal (DE)

( * ) Notice: Subject to any disclaimer, the term of this patent is extended or adjusted under 35 U.S.C. 154(b) by 0 days.

(21) Appl. No.: 09/868,593

(22) PCT Filed: Jan. 19, 2000

(86) PCT No.: PCT/EP00/00393

§ 371 (c)(1), (2), (4) Date: Aug. 24, 2001

(87) PCT Pub. No.: WO00/43114

PCT Pub. Date: Jul. 27, 2000

(30) Foreign Application Priority Data

Jan. 21, 1999 (DE) .......................... 199 01 999

(51) Int. Cl.[7] .......................... B01D 53/22; B01D 71/24
(52) U.S. Cl. .......................... 96/14; 95/51; 95/54; 96/8; 96/10; 264/41
(58) Field of Search .......................... 95/51, 54; 96/8, 96/10, 14; 264/41, 205, 209.3

(56) References Cited

U.S. PATENT DOCUMENTS

| | | | | |
|---|---|---|---|---|
| 3,754,375 A | * | 8/1973 | Bouchilloux et al. ........... | 95/51 |
| 4,020,230 A | * | 4/1977 | Mahoney et al. ............ | 96/10 X |
| 4,247,498 A | | 1/1981 | Castro | |
| 4,421,529 A | * | 12/1983 | Revak et al. ................ | 96/8 X |
| 4,564,488 A | | 1/1986 | Gerlach | |
| 4,594,207 A | | 6/1986 | Josefiak | |
| 4,744,906 A | | 5/1988 | Gerlach | |
| 4,784,880 A | * | 11/1988 | Coplan et al. ............. | 96/10 X |
| 4,940,617 A | | 7/1990 | Baurmeister | |
| 4,944,775 A | * | 7/1990 | Hayes ............................ | 95/51 |
| 4,950,314 A | * | 8/1990 | Yamada et al. ................. | 96/4 |
| 5,085,676 A | * | 2/1992 | Ekiner et al. ............... | 96/10 X |
| 5,143,312 A | | 9/1992 | Baurmeister | |
| 5,181,940 A | * | 1/1993 | Bikson et al. .............. | 96/10 X |
| 5,695,702 A | * | 12/1997 | Niermeyer ................. | 96/10 X |
| 5,707,423 A | * | 1/1998 | Pinnau et al. ................. | 96/4 X |
| 5,762,798 A | * | 6/1998 | Wenthold et al. ........... | 96/10 X |
| 5,882,518 A | * | 3/1999 | Yagi et al. .................... | 96/4 X |
| 6,245,272 B1 | * | 6/2001 | Takita et al. ............. | 264/210.4 |
| 6,258,272 B1 | * | 7/2001 | Wang et al. ........... | 210/500.41 |
| 6,375,876 B1 | * | 4/2002 | Kessler et al. ................ | 264/41 |

FOREIGN PATENT DOCUMENTS

| | | | |
|---|---|---|---|
| DE | 2833493 | 7/1980 | |
| DE | 3205289 | 8/1983 | |
| DE | 4226205 | 2/1993 | |
| EP | 0124028 A | * 11/1984 | ..................... 96/10 |
| EP | 0133882 | 3/1985 | |
| EP | 0285812 | 10/1988 | |
| EP | 0299381 | 1/1989 | |
| EP | 0371200 A | * 6/1990 | ..................... 96/10 |
| JP | 63-258605 A | * 10/1988 | ..................... 96/8 |
| WO | WO 99/04891 | 2/1999 | |

OTHER PUBLICATIONS

Robert E. Kesting, "Synthetic Polymeric Membranes", Second Edition, pp. 261–264.

C. A. Smolders et al., "Liquid–liquid Phase Separation in Concentrated Solutions of Non–Crystallizable Polymers by Spinodal Decomposition", Kolloid–Z.u.Z. Polymere 243: pp. 14–20, 1971.

* cited by examiner

Primary Examiner—Robert H. Spitzer
(74) Attorney, Agent, or Firm—Oliff & Berridge, PLC

(57) ABSTRACT

Process for producing integrally asymmetrical hydrophobic polyolefinic membranes with a separation layer, in particular for gas exchange, via thermally induced liquid-liquid phase separation. A solution of at least one polyolefin in a solvent system containing a compound A and a compound B is extruded to form a shaped object. Compound A is a strong solvent and compound B a weak non-solvent for the polymer. After leaving the die, the shaped object is cooled using a solid or liquid cooling medium, which does not dissolve the polymer and does not react chemically with it, until the phase separation and solidification of the high-polymer-content phase take place. The integrally asymmetrical membrane producible in this manner has a porosity of greater than 30% to 75% by volume, a sponge-like, open-pored, microporous support layer without macrovoids and on average isotropic pores, a separation layer on at least one of its surfaces with pores <100 nm, if any, and a gas separation factor $\alpha(CO_2/N_2)$ of at least 1. The membrane is preferably used for blood oxygenation.

33 Claims, 8 Drawing Sheets

INTEGRALLY ASYMMETRICAL POLYOLEFIN MEMBRANE

BACKGROUND OF THE INVENTION

1. Field of the Invention

The invention relates to a process for producing a hydrophobic membrane using a thermally induced phase separation process, the membrane having a sponge-like, open-pored, microporous structure. The invention relates further to a hydrophobic integrally asymmetrical membrane that is suited in particular for gas exchange and is composed primarily of at least one polymer selected from the group of polyolefins and has first and second surfaces, the membrane having a support layer with a sponge-like, open-pored, microporous structure and adjacent to this support layer on at least one of the surfaces a separation layer with denser structure, and to the use of such a membrane for blood oxygenation.

2. Description of the Related Act

In a multitude of applications in the fields of chemistry, biochemistry, or medicine, the problem arises of separating gaseous components from liquids or adding such components to the liquids. For such gas exchange processes, there is increasing use of membranes that serve as a separation membrane between the respective liquid, from which a gaseous component is to be separated or to which a gaseous component is to be added, and a fluid that serves to absorb or release this gaseous component. The fluid in this case can be either a gas or a liquid containing the gas component to be exchanged or capable of absorbing it. Using such membranes, a large exchange surface can be provided for gas exchange and, if required, direct contact between the liquid and fluid can be avoided.

An important application of membrane-based gas exchange processes in the medical field is for oxygenators, also called artificial lungs. In these oxygenators, which are used in open-heart operations, for example, oxygenation of blood and removal of carbon dioxide from the blood take place. Generally, bundles of hollow-fiber membranes are used for such oxygenators. Venous blood flows in this case in the exterior space around the hollow-fiber membranes, while air, oxygen-enriched air, or even pure oxygen, i.e., a gas, is passed through the lumen of the hollow-fiber membranes. Via the membranes, there is contact between the blood and the gas, enabling transport of oxygen into the blood and simultaneously transport of carbon dioxide from the blood into the gas.

In order to provide the blood with sufficient oxygen and at the same time to remove carbon dioxide from the blood to a sufficient extent, the membranes must ensure a high degree of gas transport: a sufficient amount of oxygen must be transferred from the gas side of the membrane to the blood side and, conversely, a sufficient amount of carbon dioxide from the blood side of the membrane to the gas side, i.e., the gas flow or gas transfer rates, expressed as the gas volume transported per unit of time and membrane surface area from one membrane side to the other, must be high. A decisive influence on the transfer rates is exerted by the porosity of the membrane, since only in the case of sufficiently high porosity can adequate transfer rates be attained.

A number of oxygenators are in use that contain hollow-fiber membranes with open-pored, microporous structure. One way to produce this type of membrane for gas exchange, such as for oxygenation, is described in DE-A-28 33 493. Using the process in accordance with this specification, membranes can be produced from meltable thermoplastic polymers with up to 90% by volume of interconnected pores. The process is based on a thermally induced phase separation process with liquid-liquid phase separation. In this process, a homogeneous single-phase melt mixture is first formed from the thermoplastic polymer and a compatible component that forms a binary system with the polymer, the system in the liquid state of aggregation having a range of full miscibility and a range with a miscibility gap, and this melt mixture is then extruded into a bath that is substantially inert with respect to, i.e., does not substantially react chemically with, the polymer and has a temperature lower than the demixing temperature. In this way, a liquid-liquid phase separation is initiated and, on further cooling, the thermoplastic polymer solidified to form the membrane structure.

An improved process for producing such membranes, which permits specific adjustment of the pore volume, size, and wall, is disclosed in DE-A-32 05 289. In this process, 5–90% by weight of a polymer is dissolved, by heating to above the critical demixing temperature, in 10–95% by weight of a solvent system of first and second compounds, which are liquid and miscible with each other at the dissolving temperature, to form a homogeneous solution, whereby the employed mixture of polymer and the cited compounds has a miscibility gap in the liquid state of aggregation below the critical demixing temperature, the first compound is a solvent for the polymer, and the second compound increases the phase separation temperature of a solution consisting of the polymer and the first compound. The solution is then given shape and, by cooling in a cooling medium consisting of the first compound or the employed solvent system, is brought to demixing and solidifying of the high-polymer-content phase, and the cited compounds are subsequently extracted.

The membranes disclosed in accordance with DE-A-28 33 493 or DE-A-32 05 289 have an open-pored, microporous structure and also open-pored, microporous surfaces. On the one hand, this has the result that gaseous substances, such as oxygen ($O_2$) or carbon dioxide ($CO_2$), can pass through the membrane relatively unrestricted and the transport of a gas then takes place as a Knudsen flow, combined with relatively high transfer rates for gases or high gas flow rates through the membrane. Such membranes with gas flow rates for $CO_2$ exceeding 5 ml/(cm$^2$*min*bar) and for $O_2$ at approximately the same level have gas flow rates that are sufficiently high for oxygenation of blood.

On the other hand, however, in extended-duration use of these membranes in blood oxygenation or generally in gas exchange processes with aqueous liquids, blood plasma or a portion of the liquid can penetrate into the membrane and, in the extreme case, exit on the gas side of the membrane, even if in these cases the membranes are produced from hydrophobic polymers, in particular polyolefins. This results in a drastic decrease in gas transfer rates. In the medical area of blood oxygenation, this is termed plasma breakthrough.

The plasma breakthrough time of such membranes, as producible in accordance with DE-A-28 33 493 or DE-A-32 05 289, is sufficient in most cases of conventional blood oxygenation to oxygenate a patient in a normal open-heart operation. However, the desire exists for membranes with higher plasma breakthrough times in order to attain higher levels of safety in extended-duration heart operations and to rule out the possibility of a plasma breakthrough that would require immediate replacement of the oxygenator. The aim, however, is also to be able to oxygenate premature infants or in general patients with temporarily restricted lung function long enough until the lung function is restored, i.e., to be able to conduct extended-duration oxygenation. A prerequisite for this is appropriately long plasma breakthrough times. A frequently demanded minimum value for the plasma breakthrough time in this connection is 20 hours.

From EP-A-299 381, hollow-fiber membranes for oxygenation are known that have plasma breakthrough times of more than 20 hours, i.e., there is no plasma breakthrough even under extended use. With the otherwise porous membrane, this is attained by a barrier layer that has an average thickness, calculated from the oxygen and nitrogen flow, not exceeding 2 $\mu$m and is substantially impermeable to ethanol. The membrane is substantially free of open pores, i.e., pores that are open both to the outside and to the inside of the hollow-fiber membrane. According to the disclosed examples, the membranes in accordance with EP-A-299 381 have a porosity of at most 31% by volume, since at higher porosity values the pores are interconnected and communication occurs between the sides of the hollow-fiber membranes, resulting in plasma breakthrough. In the barrier layer, the transport of gases to be exchanged occurs by solution diffusion.

The production of these membranes is conducted via a melt-drawing process, i.e., the polymer is first melt-extruded to form a hollow fiber and then hot- and cold-drawn. In this case, only relatively low porosity values are obtained, which means that, in conjunction with the transport occurring in the barrier layer via solution diffusion, the attainable transfer rates for oxygen and carbon dioxide remain relatively low. Moreover, while the hollow-fiber membranes in accordance with EP-A-299 381 exhibit sufficient tensile strength as a result of the pronounced drawing in conjunction with manufacture, they have only a small elongation at break. In subsequent textile processing steps, such as producing hollow-fiber mats, which have proven excellent in the production of oxygenators with good exchange capacity and as are described in EP-A-285 812, for example, these hollow-fiber membranes are therefore difficult to process.

Typically, in melt-drawing processes, membranes are formed with slit-shaped pores with pronounced anisotropy, the first main extension of which is perpendicular to the drawing direction and the second main extension perpendicular to the membrane surface, i.e., in the case of hollow-fiber membranes, runs between the exterior and interior surfaces of the membrane, so that the channels formed by the pores run in a relatively straight line between the surfaces. In the case in which, for example, mechanical damage in the spinning process causes leaks in the barrier layer, a preferred direction then exists for the flow of a liquid between the interior and exterior surfaces or vice-versa, thereby promoting plasma breakthrough.

SUMMARY OF THE INVENTION

It is therefore an object of the invention to provide a process with a wide variety of applications and with which integrally asymmetrical membranes with a microporous support structure and a separation layer with denser structure can be produced that are suited for gas exchange and that exhibit at least to a reduced extent the disadvantages of the prior art membranes, permit high gas exchange capacity, are impervious at least over extended periods of time to a breakthrough of hydrophilic liquids, in particular blood plasma, i.e., are suited in particular to extended-duration oxygenation, and have good qualities for further processing.

It is a further object of the invention to provide membranes in particular for gas exchange in which the disadvantages of the prior art membranes are at least reduced, that have a high capacity for gas exchange and sufficiently high gas flow rates for blood oxygenation, are resistant at least over extended periods of time to the breakthrough of hydrophilic liquids, in particular blood plasma, and exhibit good qualities for further processing.

The object is met by a process for producing an integrally asymmetrical hydrophobic membrane having a sponge-like, open-pored, microporous support structure and a separation layer with a denser structure compared to the support structure, the process comprising at least the steps of:

a) preparing a homogeneous solution of 20–90% by weight of a polymer component consisting of at least one polymer, selected from the group of polyolefins, in 80–10% by weight of a solvent system containing a compound A and a compound B that are liquid and miscible with each other at the dissolving temperature, whereby the employed mixture of the polymer component and compounds A and B has a critical demixing temperature and a solidification temperature and has a miscibility gap in the liquid state of aggregation below the critical demixing temperature, and whereby a solvent for the polymer component is selected for compound A, and compound B raises the demixing temperature of a solution consisting of the polymer component and compound A, b) rendering the solution to form a shaped object, with first and second surfaces, in a die having a temperature above the critical demixing temperature, c) cooling of the shaped object using a cooling medium, tempered to a cooling temperature below the solidification temperature, at such a rate that a thermodynamic non-equilibrium liquid-liquid phase separation into a high-polymer-content phase and a low-polymer content phase takes place and solidification of the highpolymer-content phase subsequently occurs when the temperature falls below the solidification temperature, d) possibly removing compounds A and B from the shaped object, characterized in that a strong solvent for the polymer component is selected for compound A, for which the demixing temperature of a solution of 25% by weight of the polymer component in this solvent is at least 10% below the melting point of the pure polymer component, that a weak non-solvent for the polymer component is selected for compound B, which does not dissolve the polymer component to form a homogeneous solution when heated to the boiling point of compound B and for which the demixing temperature of a system consisting of 25% by weight of the polymer component, 10% by weight of the weak non-solvent, and 65% by weight of compound A, used as a solvent, is at most 8% above the demixing temperature of a system consisting of 25% by weight of the polymer component and 75% by weight of compound A, and that, for cooling, the shaped object is brought into contact with a solid or liquid cooling medium that does not dissolve or react chemically with the polymer component at temperatures up to the die temperature.

Surprisingly, it has been shown that, by adhering to these process conditions, integrally asymmetrical membranes are obtained in which at least one surface is formed as a separation layer, which has a denser structure compared to the support layer structure and covers the adjacent sponge-like, open-pored, microporous support layer structure. The process according to the invention allows the realization of separation layers with very thin layer thickness, whose structure can be adjusted down to a nanoporous structure with pores at most 100 nm or to a dense structure. At the same time, the support layer of the membranes produced in this manner has a high volume porosity. Preferably, using the process according to the invention, integrally asymmetrical membranes are produced with a dense separation layer. In the context of the present invention, a dense separation layer is understood to be one for which no pores are evident based on an examination by scanning electron microscope at 60000×magnification of the membrane surface having the separation layer.

The process according to the invention thus permits the production of integrally asymmetrical membranes with a separation layer that renders the membranes impervious over long periods of time to liquid breakthrough but at the same time gas permeable, and with a support layer with high volume porosity, resulting at the same time in high gas transfer capacity for these membranes in gas transfer processes.

The object is therefore further met by a hydrophobic integrally asymmetrical membrane, in particular for gas exchange, that is composed substantially of at least one polymer selected from the group of polyolefins and has first and second surfaces, the membrane having a support layer with a sponge-like, open-pored, microporous structure and adjacent to this support layer on at least one of its surfaces a separation layer with denser structure, characterized in that the pores, if any, in the separation layer have an average diameter <100 nm, that the support layer is free of macrovoids and the pores in the support layer are on average substantially isotropic, and that the membrane has a porosity in the range from greater than 30% to less than 75% by volume and a gas separation factor $\alpha(CO_2/N_2)$ of at least 1.

These membranes find excellent application for blood oxygenation, whereby the separation layer of these membranes is responsible for making these membranes impervious over extended periods of time to the breakthrough of blood plasma.

BRIEF DESCRIPTION OF THE DRAWINGS

The invention will now be described in more detail with reference to the following examples and figures.

DETAILED DESCRIPTION OF PREFERRED EMBODIMENTS

Figures 1, 2, 3:
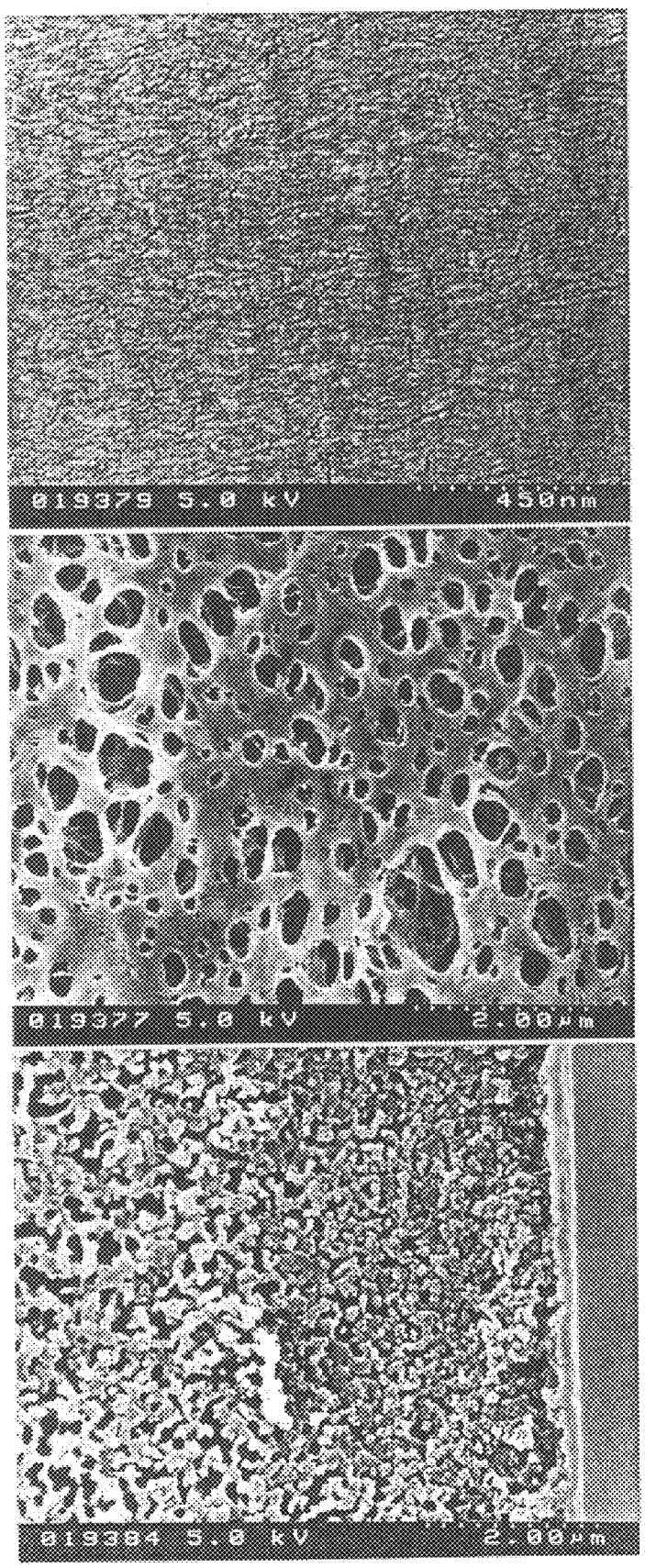
FIG. 1 shows a scanning electron microscopic (SEM) image of the exterior surface of a hollow-fiber membrane according to example 1 at 60000×magnification.
FIG. 2 shows an SEM image of the interior surface of a hollow-fiber membrane according to example 1 at 13500× magnification.
FIG. 3 shows an SEM image of the surface of fracture perpendicular to the longitudinal axis of a hollow-fiber membrane according to example 1, in the vicinity of its outer side, at 13500×magnification.

Within the context of the present invention, an integrally asymmetrical membrane is understood to be one in which the separation and support layers consist of the same material and have been formed together directly during membrane production and both layers are integrally joined with each other as a result. In the transition from the separation layer to the support layer, there is merely a change with respect to the membrane structure. Contrasting with this are composite membranes, for example, which have a multilayer structure formed by applying, in a separate process step, a dense layer as a separation layer on a porous, often microporous support layer or support membrane. The result is that the materials constituting the support and separation layers also have different properties in the case of composite membranes.

The process according to the invention is based on a thermally induced phase separation process with liquid-liquid phase separation. According to the invention, the polymer component and compounds A and B form a binary system, which in the liquid state of aggregation has a range in which the system is present as a homogeneous solution and a range in which it exhibits a miscibility gap. If such a system is cooled, from the range in which it is present as a homogenous solution, below the critical demixing or phase separation temperature, liquid-liquid demixing or phase separation into two liquid phases, namely one with a high polymer content and the other with a low polymer content, initially takes place. On further cooling, below the solidification temperature, the high-polymer-content phase solidifies to form a three-dimensional membrane structure. The cooling rate thereby has a substantial influence on the pore structure being created. If the cooling rate is high enough that the liquid-liquid phase separation cannot take place under thermodynamic equilibrium conditions but rather under thermodynamic non-equilibrium conditions and on the other hand still relatively slowly, the liquid-liquid phase separation occurs approximately concurrently with the formation of a large number of droplets of liquid that are of substantially the same size. The resulting polymer object then has a sponge-like cellular and open-pored microstructure. If the cooling rate is significantly higher, the polymer solidifies before most of the droplets of liquid can form. In this case, network-like microstructures are formed. The variety of such sponge-like microporous structures formed via processes with thermally induced liquid-liquid phase separation are described in detail in DE-A-27 37 745, to the disclosure of which reference is hereby explicitly made, and depicted for example in R. E. Kesting, "Synthetic Polymeric Membranes", John Wiley & Sons, 1985, pp. 261–264.

The employed combinations of the polymer component, compound A, and compound B, whereby compounds A and B together form the solvent system, must be convertible jointly into a single homogeneous liquid phase and have a critical demixing temperature below which a phase separation into two liquid phases occurs. This is higher, however, than the demixing temperature of a solution containing equal parts of polymer but only compound A as a solvent system. In polymer/compound A systems with a miscibility gap in the liquid state of aggregation, the addition of compound B therefore raises the critical demixing temperature. Adding compound B enables selective control of pore size and pore volume in the porous structures obtained.

For compound A, compounds are to be used that are solvents for the polymer component and in which, when heated at most to the boiling point of this compound, this polymer component is dissolved completely to form a homogeneous solution. According to the invention, a solvent must be used as compound A for which the demixing temperature of a solution of 25% by weight of the polymer component in this solvent is at least 10% under the melting point of the pure component consisting of the at least one polymer. Within the scope of the present invention, such a solvent is referred to as a strong solvent.

The demixing or phase separation temperature can be determined in a simple manner by initially preparing a homogeneous solution of the polymer component in the solvent to be investigated and then heating this solution to a temperature approximately 20° C. above the dissolving temperature. This solution is stirred and maintained at this temperature for about 0.5 hours, in order to achieve sufficient homogeneity. Subsequently, the solution is stirred and cooled at a rate of 1° C./min. The phase separation temperature is determined as the temperature at which clouding becomes visible. On further cooling, the phase with high polymer content solidifies at the solidification temperature.

For compound B, according to the invention a compound is selected that is a weak non-solvent for the polymer component. Non-solvent for the polymer component is understood to mean a compound that does not dissolve the polymer component, in a concentration of 1% by weight in the non-solvent, to form a homogeneous solution when heated to at most the boiling point of this nonsolvent. In the scope of the present invention, the strength of the non-solvent is assessed on the basis of the difference between the demixing temperature of a system consisting of the polymer component and a strong solvent and the demixing temperature of a corresponding system containing as a solvent system the same solvent and 10% by weight of the nonsolvent to be investigated. The polymer concentration in each case is 25% by weight. A weak non-solvent is then understood to be one that leads to an increase in the demixing temperature of at most 8% relative to the demixing temperature of the corresponding system consisting only of solvent and polymer. A strong non-solvent is, by definition, one that leads to an at least 10% increase in the demixing temperature.

Compound A can also be blended with one or more liquids, in particular other solvents. Compound B can also be employed as a mixture with one or more other compounds, in particular additional non-solvents. As a result, within the context of the present invention, compound A is understood as not only a single compound but also a mixture of different solvents, for example two strong solvents or a strong with a weak solvent, as long as the overall action as a strong solvent is maintained. Likewise, compound B is also understood to be a mixture of different non-solvents, for example several weak non-solvents, as long as the action as a weak non-solvent is maintained.

The fraction of polymer required for membrane production and the ratio of compound A to compound B in the solvent system can be determined by generating phase diagrams in simple experiments. Such phase diagrams can be developed using known methods, such as are described in C. A. Smolders, J. J. van Aartsen, A. Steenbergen, Kolloid-Z. und Z. Polymere, 243 (1971), pp. 14–20. As a rule, for a given solvent A, the fraction of compound B, i.e., weak non-solvent, in the mixture of the polymer component, compound A, and compound B depends on the strength of the nonsolvent, i.e., compound B. Preferably, the fraction of compound B in the solvent system is 1 to 45% by weight.

According to the invention, the polymer component used is at least one polymer selected from the group of polyolefins. In this case, the polymer component can be a single polyolefin or a mixture of several polyolefins, whereby the polyolefins in the present context also include polyolefin copolymers or modified polyolefins. Mixtures of different polyolefins are interesting in that various properties such as permeability or mechanical characteristics can be optimized. For example, by adding just slight amounts of a polyolefin with an ultrahigh molecular weight, for example exceeding $10^6$ daltons, a strong influence can be exerted on the mechanical properties. A prerequisite for this, of course, is that the polyolefins employed together be soluble in the solvent system used.

In an advantageous embodiment of the process according to the invention, the at least one polymer in the polymer component is a polyolefin consisting exclusively of carbon and hydrogen. Especially preferred polyolefins are polypropylene and poly(4-methyl-1-pentene) or mixtures of these polyolefins among themselves or with other polyolefins. Of particular advantage is the use of poly(4-methyl-1-pentene) or a mixture of poly(4-methyl-1-pentene) with polypropylene. High gas transfer rates can be realized thereby, while maintaining good mechanical properties for the membranes.

For compounds A and B, which jointly form the solvent system, compounds are to be used that fulfill the stated conditions. In the case of the preferred use of polypropylene as the polymer, dioctyl adipate, isopropyl myristate, or mixtures thereof are preferably used for compound A. Compound B in this case can advantageously be diethyl phthalate, glycerin triacetate, castor oil, glycerin diacetate, or mixtures thereof. In the preferred use of poly(4-methyl-1-pentene) as the polymer, compound A is preferably dioctyl adipate, isopropyl myristate, diphenyl ether, dibenzyl ether, or mixtures thereof. Glycerin triacetate, diethyl phthalate, castor oil, N,N-bis(2-hydroxyethyl)tallow amine, soybean oil, or mixtures thereof have proven advantageous as compound B. Especially good results are exhibited when glycerin triacetate is used as compound B.

The polymer fraction of the mixture from which the solution is formed is preferably 30–60% by weight, and the fraction of the solvent system, consisting of compounds A and B, is 70–40% by weight. The polymer fraction is especially preferred to be 35–50% by weight and the fraction of compounds A and B 65–50% by weight. If necessary, additional substances such as antioxidants, nucleating agents, fillers, components to improve biocompatibility, i.e., blood tolerance when using the membrane in oxygenation, such as vitamin E, and similar substances can be employed as additives to the polymer component, compounds A and B, or to the polymer solution.

The polymer solution formed from the polymer component and the solvent system is given shape using suitable dies to produce a membrane preferably in the form of a flat or hollow-fiber membrane. Conventional dies such as sheeting dies, casting molds, doctor blades, profiled dies, annular-slit dies, or hollow-fiber dies can be employed.

Preferably, hollow-fiber membranes are produced using the process according to the invention. In this case, the polymer solution is extruded through the annular gap of the corresponding hollow-fiber dies to form a shaped object, i.e., a hollow fiber. A fluid is metered through the central bore of the hollow-fiber die that acts as an interior filler that shapes and stabilizes the lumen of the hollow-fiber membrane. The extruded hollow fiber or resulting hollow-fiber membrane then exhibits a surface facing the lumen, the interior surface, and a surface facing away from the lumen, the exterior surface, separated from the interior surface by the wall of the hollow fiber or hollow-fiber membrane.

After shaping, the shaped object is cooled using a solid or liquid cooling medium, so that a thermodynamic non-equilibrium liquid-liquid phase separation occurs in the shaped object, i.e., in the shaped polymer solution, and the polymer structure subsequently solidifies and hardens. In this process, the cooling medium has been tempered to a temperature below the solidification temperature. According to the invention, in order to produce the desired integrally asymmetrical membrane with separation layer, the cooling medium must be one that does not dissolve the polymer component and does not chemically react with it, even when the medium is heated to the die temperature. The use of such a cooling medium is decisive for the formation of a separation layer with denser structure. Such a requirement placed on the cooling medium rules out, for example, the use as a cooling medium of the mixture of compounds A and B employed as the solvent system. Although such a system would not dissolve the polymer component at the cooling temperature, the polymer component forms a homogeneous solution at the die temperature, as previously noted.

It is advantageous if the exit surface of the die and the surface of the cooling medium are spatially separated by a gap, which is transited by the shaped object prior to contact with the cooling medium. The gap can be an air gap, or it can also be filled with another gaseous atmosphere, and it can also be heated or cooled. The polymer solution, however, can also be brought directly into contact with the cooling medium after exiting from the die.

In the production of flat membranes, the cooling medium can be a solid material or a solid surface, for example in the form of a glass or metal plate or an appropriately temperature-controlled or cooled cooling roller, onto which the shaped object is laid. Preferably, the solid cooling medium has a high thermal conductivity and is especially preferred to consist of a metallic material.

In an advantageous embodiment of the process according to the invention, however, a liquid cooling medium is used. It is especially preferred for the liquid used as the cooling medium to be a non-solvent for the polymer component, i.e., it does not dissolve the polymer component to form a homogeneous solution when heated to at most the boiling point of the cooling medium. The liquid used as the cooling medium can also contain a component that is a solvent for the polymer component, or it can also be a mixture of different non-solvents, as long as it overall does not dissolve the polymer component at temperatures up to at least the die temperature. It is observed in this case that the degree of non-solvent character of the cooling medium influences the tightness of the separation layer being formed. In an especially preferred embodiment of the process according to the invention, therefore, a liquid is used as a cooling medium that is a strong non-solvent for the polymer component. Concerning the definitions of non-solvent and strong non-solvent, refer to the previous discussion in conjunction with compound B. Preferably, the cooling medium at the cooling temperature is a homogeneous, single-phase liquid. This ensures production of membranes with especially homogeneous surface structures. The liquid cooling medium can be one that is miscible with the solvent system to form a homogeneous solution or one that does not dissolve the compounds forming the solvent system.

To initiate a thermodynamic non-equilibrium liquid-liquid phase separation, the temperature of the cooling medium must be significantly below the critical demixing temperature or phase separation temperature of the polymer solution used and furthermore below the solidification temperature in order to solidify the phase with high polymer content. In this case, the formation of the separation layer is promoted when there is as great a difference as possible between the demixing temperature and the temperature of the cooling medium. The cooling medium preferably has a temperature at least 100° C. below the phase separation temperature, and especially preferably a temperature that is at least 150° C. below the phase separation temperature. It is particularly advantageous if the temperature of the cooling medium in this case is under 50° C. In individual cases, cooling to temperatures below ambient temperature can be required. It is also possible for cooling to take place in several steps.

The liquid cooling medium is preferably in a shaft or spinning tube which the shaped object passes through for cooling purposes. The cooling medium and shaped object are generally fed in the same direction through the shaft or spinning tube. The shaped object and cooling medium can be fed at the same or different linear speeds through the spinning tube, whereby, depending on the requirement, either the shaped object or the cooling medium can have the higher linear speed. Such process variants are described in DE-A-28 33 493 or EP-A-133 882, for example.

The interior filler employed in extrusion of hollow filaments can be in gaseous or liquid form. When using a liquid as the interior filler, a liquid must be selected that substantially does not dissolve the polymer component in the shaped polymer solution below the critical demixing temperature of the polymer solution. To achieve an openpored structure on the interior surface, interior fillers are preferably used that are solvents for the at least one polymer used, whereby the previously cited condition must be observed, and/or temperatures of the interior filler are set that are in the vicinity of the polymer solution temperature. In other respects, the same liquids can be used as can also be used as the cooling medium. In this manner, hollow-fiber membranes can be produced that have a separation layer on both their outside and inside, or also hollow-fiber membranes that have a separation layer only on the inside. Preferably, the interior filler is then a non-solvent for the polymer component and especially preferably a strong non-solvent for the polymer component. The interior filler can be miscible with the solvent system. In case the fluid is gaseous, it can be air, a vaporous material, or preferably nitrogen or other inert gases.

In a further advantageous embodiment of the process according to the invention, at least one of the surfaces of the shaped object leaving the die, i.e. the polymer solution leaving the die in a shaped state, preferably the surface on which the separation layer is to be formed, is subjected prior to cooling to a gaseous atmosphere promoting the evaporation of compound A and/or B, i.e., to an atmosphere in which the evaporation of compound A and/or B is possible. Preferably, air is used to form the gaseous atmosphere. Likewise preferred are nitrogen or other inert gases or also vaporous media. The gaseous atmosphere is advantageously conditioned and generally has a temperature below that of the die. To evaporate a sufficient fraction of compound A and/or B, at least one of the surfaces of the shaped object is preferably subjected to the gaseous atmosphere for at least 0.5 ms.

To provide the gaseous atmosphere promoting the evaporation of compound A and/or B, the die and cooling medium can, as previously noted, be spatially separated such that a gap is formed between them that contains the gaseous atmosphere and through which the shaped object passes.

In producing flat membranes, for example, the polymer solution extruded through a sheeting die, for example, can, as a flat sheet, initially be passed through a gap, such as an air gap, before being cooled. In this case, both surfaces of the flat sheet, as well as the edges, are enveloped by the gaseous atmosphere, influencing the formation of a separation layer on both surfaces of the resulting flat membrane. If the extrusion of the flat sheet is performed directly onto a heated carrier, for example in the form of a heating roller, and if the flat sheet on the carrier then passes through a defined zone in a gaseous atmosphere before being cooled by the cooling medium, only one surface of the flat sheet, namely that facing away from the heating roller, comes into contact with the gaseous atmosphere, thus influencing the formation of a separation layer, by evaporation, only on this surface.

In the case of producing hollow-fiber membranes, the hollow filament leaving the die can likewise be directed through a gap formed between the die and cooling medium and containing the gaseous atmosphere.

In individual cases, the structure of the separation layer can also be influenced by drawing the shaped polymer solution after exiting the die, i.e. particularly in the air gap, whereby the drawing is effected by establishing a difference between the exit speed of the polymer solution from the die and the speed of the first withdrawal device for the cooled shaped object.

After cooling and hardening of the polymer structure, compounds A and B are usually removed from the shaped object. Removal can be performed, for example, by extraction. Preferably, extraction agents are used that do not dissolve the polymer or polymers but are miscible with compounds A and B. Subsequent drying at elevated temperatures can be necessary to remove the extraction agent from the membrane. Suitable extraction agents are acetone, methanol, ethanol, and preferably isopropanol.

In some cases it can also be practical to retain one or both of the two compounds A and B at least in part in the shaped object and to extract only one or neither of the compounds. Other components added to compounds A and/or B as additives can remain in the membrane structure as well and thus serve as functional active liquids, for example. Various examples of microporous polymers containing functional active liquids are described in DE-A 27 37 745.

Before or after the removal of at least a substantial portion of the solvent system, a slight drawing of the membrane can take place in order in particular to modify the properties of the separation layer in a specific manner. For example, in a substantially dense separation layer, drawing can be used to create pores and/or adapt the pore size of the separation layer to the size required by the specific application for the resulting membrane.

In producing the membrane of the invention, however, the pores must remain under 100 nm, so that the membrane is suitable for gas exchange or also gas separation, premature breakthrough of liquid can be avoided, and the gas separation factor $\alpha(CO_2/N_2)$ remains at least 1 in accordance with the invention. For this reason, the drawing should generally not exceed 10–15% when producing the membrane of the invention. The drawing can, as required, also be performed in multiple directions and is advantageously performed at elevated temperatures. For example, such drawing can also be conducted during drying of the membrane that might be necessary after extraction.

Using the process according to the invention, membranes can, on the one hand, be produced for gas separation tasks in which, for example, a single gas component is selectively separated from a mixture of at least two gases or a single gas component in a mixture of at least two gases is enriched, or for gas transfer tasks, in which a gas dissolved in a liquid is selectively removed from this liquid, and/or a gas from a mixture of gases is dissolved in a liquid. On the other hand, adjustment of the pore size of the separation layer, for example in a downstream drawing step, also permits production of membranes for nanofiltration, such as for separating low-molecular substances preferably from non-aqueous media, or for ultrafiltration, such as for treating fresh water, sewage, or process water, as well as for applications in the food and dairy industries.

The process according to the invention is particularly suited to producing the integrally asymmetrical membrane according to the invention.

Due to its structure, the membrane of the invention is distinguished by high gas flow rates and high gas transfer rates while maintaining high levels of safety with respect to a breakthrough of the liquid, from which, when using the membrane of the invention for gas transfer, a gaseous component is to be separated or to which a gaseous component is to be added, and also by good mechanical properties. To achieve this, the membrane has a high volume porosity, whereby the latter is determined substantially by the structure of the support layer, and a defined separation layer with a structure denser than that of the support layer and with reduced thickness.

The support layer of the membrane of the invention can have the aforementioned various structures. In one embodiment of the membrane of the invention, the support layer has a sponge-like, cellular and open-pored structure, in which the pores can be described as enveloped microcells that are interconnected by channels, smaller pores, or passages. In another embodiment of the membrane of the invention, the support layer has a non-cellular structure, in which the polymer phase and the pores form interpenetrating network structures. In any case, however, the support layer is free of macrovoids, i.e., free of such pores often referred to in the literature as finger pores or caverns.

The pores of the support layer can have any geometry and be, for example, of elongated, cylindrical, rounded shape, or also have a more or less irregular shape. In accordance with the invention, the pores in the support layer are on average substantially isotropic. This is understood to mean that, although the individual pores can also have an elongated shape, the pores on average in all spatial directions have substantially the same extension, whereby deviations of up to 20% can exist between the extensions in the individual spatial directions.

With an insufficiently low volume porosity, i.e. an insufficient pore fraction compared to the total volume of the membrane, the attainable gas flow and gas transfer rates are too low. On the other hand, an excessive pore fraction in the membrane leads to deficient mechanical properties, and the membrane cannot be readily processed in subsequent processing steps. For this reason, the membrane of the invention has a volume porosity in the range of greater than 30% to less than 75% by volume, preferably greater than 50% to less than 75% by volume, and especially preferably greater than 50% to less than 65% by volume.

The membrane of the invention can have a separation layer on only one of its surfaces, or it can have a separation layer on both surfaces. A preferred embodiment of the membrane of the invention has a separation layer only on one, the first surface, and the second surface on the opposite side of the support layer has an open-pored, network-like structure with approximately circular openings. Approximately circular openings are understood to be openings in which the ratio of the major axis to the minor axis does not exceed 2:1. Due to their open-pored structure, such membranes have on their one side a comparatively small resistance to gas flow, for example. In the membranes of the invention, existing pores in the surface exhibited by the separation layer, whose diameters are <100 nm in accordance with the invention, are distributed uniformly, i.e., homogeneously over this surface.

The separation layer influences on the one hand the gas flow and gas transfer rates but on the other hand the breakthrough time, i.e., the time the membrane is protected from a breakthrough of the liquid from which, when using the membrane of the invention, a gaseous component is to be separated or to which a gaseous component is to be added, or from a breakthrough of components contained in the liquid. It also influences whether and how well various gases in a gas mixture can be separated from one another, i.e., the gas separation factor $\alpha(CO_2/N_2)$, for example.

With a non-porous separation layer, very long breakthrough times are the result, but the transfer rates and gas flow rates are limited in size, since in non-porous membrane layers the gas transfer or gas flow takes place solely via a comparatively slow solution diffusion, in contrast to the considerably greater Knudsen flow in porous structures. In the case of a porous separation layer, on the other hand, the gas transfer rates and gas flow rates are higher than those with a non-porous separation layer, but reduced breakthrough times result due to the pores.

The tightness of the separation layer and its suitability in particular for gas transfer can often not be evaluated with sufficient reliability solely on the basis of visual inspection, using a scanning electron microscope for example. In this case, not only the size of existing pores or in general structural defects such as fissures but also their number play a role. However, the absence or presence of pores and/or defects, as well as their number, can be evaluated by examining the gas permeation and gas flow through the membrane as well as the gas separation factors.

It is well known that the general principles of gas transport in polymer membranes depend on the pore size in the membrane. In membranes in which the separation layer has pores at most 2–3 nm in size, the gas permeates through this membrane via solution diffusion mechanisms. The permeability coefficient $P_0$ of a gas then depends solely on the polymer material of the membrane and on the gas itself, and the gas flow $Q_0$, i.e., the permeability coefficient divided by the membrane thickness, depends, for a given gas, only on the thickness of the non-porous membrane. The gas separation factor a, which specifies the ratio of the permeability coefficients or the gas flows Q of two gases in this membrane, therefore depends likewise solely on the polymer material and not, for example, on the thickness of the separation layer. For example, the gas separation factor for $CO_2$ and $N_2$ is then $\alpha_0(CO_2/N_2)=P_0(CO_2)/P_0(N_2)$. For polymers in general use, resulting $\alpha_0(CO_2/N_2)$ values are at least 1 and generally at least 3.

In porous membranes with pores between 2 nm and about 10 $\mu$m in size, the transport of gases takes place primarily via Knudsen flow. The calculated gas separation factors $\alpha_1$, as the ratio of the measured apparent permeability coefficients, are then inversely proportional to the square root of the ratio of the molecular weights of the gases. For $\alpha_1(CO_2/N_2)$, therefore, the result is $\sqrt{28/44}=0.798$, for example.

If a gas permeates the membranes of the present invention, which have a microporous support structure and compared with it a denser separation layer with pores not exceeding 100 nm on average, the permeation through the separation layer is the step that determines the rate. If this separation layer has a significant number of pores or defects, on the one hand the apparent permeability coefficients increase, but on the other hand the gas separation factor decreases. For this reason, the presence or absence of pores and/or defects in the separation layer of the membranes of the invention can be determined on the basis of the measured gas separation factors for $CO_2$ and $N_2$, $\alpha(CO_2/N_2)$. If the $CO_2/N_2$ gas separation factor $\alpha(CO_2/N_2)$ is less than 1, the membrane has an excessive number of pores or defects in the separation layer. If the number of pores or defects in the separation layer is too high, however, a premature liquid breakthrough or plasma breakthrough can no longer be ruled out with adequate certainty, and the membranes are not suitable for extendedduration use in blood oxygenation. Such membranes are likewise unsuitable for gas separation applications. The membranes of the invention, therefore, have a gas separation factor $\alpha(CO_2/N_2)$ of at least 1, preferably at least 2, and especially preferably at least 5.

The separation layer must not be too thin, since this increases the risk of defects and thus of breakthrough, and the resulting $\alpha(CO_2/N_2)$ values are too low. However, the time to actual breakthrough is still relatively long, since with the membranes of the invention there is no preferred direction for the flow of a liquid; rather, the course of the liquid is tortuous due to the pore structure. Contrasting with this are membranes produced according to the aforementioned melt-drawing process, in which, due to the pronounced anisotropy of the pores, a preferred direction for the flow of the liquids from one surface to the other results.

While excessively thin separation layers make the risk of defects too great, an excessive separation layer thickness makes the transfer rates and gas flow rates too low. Preferably, therefore, the thickness of the separation layer lies between 0.01 $\mu$m and 5 $\mu$m, especially preferably between 0.1 $\mu$m and 2 $\mu$m. Membranes of the invention with a separation layer thickness between 0.1 $\mu$m and 0.6 $\mu$m are excellently suited. The thickness of the separation layer can be determined for the membranes of the invention in a simple manner by measuring the layer using fracture images generated by scanning electronic microscopy or by ultrathin-section characterizations using transmission electron microscopy. In conjunction with the high porosity of the membranes, this permits the attainment of a sufficiently high permeability of the membranes for use in blood oxygenation and thus sufficiently high gas flow rates. Preferably, therefore, the membranes of the invention have a gas flow Q for $CO_2$, $Q(CO_2)$, of at least 5 ml/(cm$^2$*min*bar).

An important application of the membranes of the invention is oxygenation of blood. In these applications, as previously noted, the plasma breakthrough time plays a role, i.e., the time in which the membrane is stable against a breakthrough of blood plasma. It must be emphasized that plasma breakthrough is a considerably more complex process than the mere penetration of a hydrophobic membrane by a hydrophilic liquid. According to accepted opinion, plasma breakthrough is induced by the fact that initially proteins and phospholipids in the blood effect a hydrophilation of the pore system-of the membrane, and in a subsequent step a sudden penetration of blood plasma into the hydrophilated pore system takes place. The critical variable for a liquid breakthrough is therefore considered to be the plasma breakthrough time. The membranes of the invention preferably exhibit a plasma breakthrough time of at least 20 hours, and especially preferably a plasma breakthrough time of at least 48 hours.

In general, in the membranes produced according to the invention and the membranes of. the invention, the transition from the porous support layer to the separation layer takes place in a narrow region of the membrane wall. In a preferred embodiment of the membrane of the invention, the membrane structure changes abruptly in the transition from the separation layer to the support layer, i.e., the membrane structure changes substantially transition-free and suddenly from the microporous support structure to the separation layer. Membranes with such a structure have, in comparison to membranes with a gradual transition from the separation layer to the support layer, the advantage of higher permeability of the support layer for gases to be transferred, since the support layer is less compact in its area adjacent to the separation layer.

The hydrophobic membrane of the invention consists substantially of at least one polymer selected from the group of polyolefins. The at least one polymer can be a single polyolefin or a mixture of several polyolefins, including polyolefin copolymers or modified polyolefins. Mixtures of polyolefins with different molecular weights or of various polyolefins are interesting to the extent that they allow various properties to be optimized, such as gas transfer rates or mechanical properties. For example, by adding just slight amounts of a polyolefin-with an ultrahigh molecular weight, exceeding $10^6$ daltons, for example, a strong influence can be exerted on the mechanical properties.

Preferably, the membrane is composed of a polyolefin consisting exclusively of carbon and hydrogen. It is especially preferred for the membrane to be made from polypropylene or poly(4-methyl-1-pentene) or mixtures of these polyolefins with other polyolefins. Of particular advantage is the use of poly(4-methyl-1-pentene) or a mixture of poly(4-methyl-1-pentene) with polypropylene. High gas transfer rates can be realized with good mechanical properties for the membranes. If necessary, the at least one polymer can contain additional materials as additives, such as antioxidants, nucleating agents, fillers, components to improve biocompatibility, i.e., blood tolerance when using the membrane in oxygenation, such as vitamin E, and similar substances.

In a preferred embodiment, the membrane is a flat membrane. The flat membrane preferably has a thickness between 10 and 300 $\mu$m, especially preferably between 30 and 150 $\mu$m. The flat membrane can have a separation layer on only one of its surfaces or on both surfaces.

In a likewise preferred embodiment, the membrane of the invention is a hollow-fiber membrane. Depending on the embodiment, it can have a separation layer on its interior surface only, i.e. on the surface facing the lumen, or only on its exterior surface, i.e. the surface facing away from the lumen, or on both the interior and exterior surfaces. The separation layer is preferably on the exterior surface. The hollow-fiber membrane preferably has an outside diameter between 30 and 3000 $\mu$m, especially preferably between 50 and 500 $\mu$m. A wall thickness of the hollow-fiber membrane between 5 and 150 $\mu$m is advantageous, and a thickness between 10 and 100 $\mu$m is especially advantageous.

The membrane of the invention has outstanding mechanical properties, readily enabling processing in subsequent processing steps. When using the hollow-fiber membrane, it has proven beneficial for the hollow-fiber membranes, with respect to the performance characteristics of membrane modules made therefrom, to be initially formed, for example, by appropriate knitting processes into mats of hollow-fiber membranes substantially parallel to each other, which are then fashioned into appropriate bundles. The associated textile processes impose stringent demands on the mechanical properties of the membranes, in particular on the tensile strength and elongation. These requirements are fulfilled by the membrane of the invention. The hollow-fiber membranes of the invention preferably have a breaking force of at least 70 cN and an elongation at break of at least 75%.

The membrane of the invention can be used in numerous applications in which a membrane is required with a separation layer with pores at most 100 nm in size. Preferably, the membrane of the invention is suited for applications in the fields of gas separation or gas exchange, in which gaseous components are to be separated from liquids or added to them. Due to their high impermeability for plasma, i.e. to their long plasma breakthrough times, and their high gas transfer capacity for $O_2$ and $CO_2$, the membranes of the invention are excellently suited for use in oxygenators, i.e., for the oxygenation of blood and in particular for the extended-duration oxygenation of blood.

Determination of the Plasma Breakthrough Time:

To determine the plasma breakthrough time, a phospholipid solution maintained at 37° C. (1.5 g L-α-Phosphatidy- LCholine dissolved in 500 ml physiological saline solution) is directed with a flow of 6 l/(min*2m$^2$) at a pressure of 1.0 bar along one surface of a membrane sample. Air is allowed to flow along the other surface of the membrane sample, the air after exiting the membrane sample being fed through a cooling trap. The weight of the liquid accumulated in the cooling trap is measured as a function of time. The time until the occurrence of a significant increase in the weight, i.e., to the first significant accumulation of liquid in the cooling trap, is designated as the plasma breakthrough time.

Determination of the Volume Porosity:

A sample of at least 0.5 g of the membrane to be examined is weighed in a dry state. The membrane sample is then placed for 24 hours into a liquid that wets the membrane but does not cause it to swell, such that the liquid penetrates into all pores. This can be detected visually in that the membrane sample is transformed from an opaque to a glassy, transparent state. The membrane sample is then removed from the liquid, liquid adhering to the sample removed by centrifugation at about 1800 g, and the mass of the thus pretreated wet, i.e., liquid-filled, membrane, determined.

The volume porosity in % is determined according to the following formula:

$$\text{Volume porosity } [\%] = 100 * \frac{(m_{wet} - m_{dry})/\rho_{liq.}}{(m_{wet} - m_{dry})/\rho_{liq.} + m_{dry}/\rho_{polymer}}$$

where $m_{dry}$=weight of the dry membrane sample $m_{wet}$=weight of the wet, liquid-filled membrane sample $\rho_{liq.}$=density of the liquid used $\rho_{polymer}$=density of the membrane polymer Determination of the Gas Flow Rates To determine the gas flow rates, one of the sides of a membrane sample is subjected to the gas to be measured, under a constant test pressure of 2 bar. In the case of hollow-fiber membranes, the gas is introduced into the lumen of the hollow-fiber membrane for this purpose. The volume stream of the gas penetrating through the wall of the membrane sample is determined and standardized with respect to the test pressure and area of the membrane sample penetrated by the gas stream. For hollow-fiber membranes, the interior surface of the membrane enclosing the lumen is employed for this.

Determination of the Breaking Force and Elongation at Break:

To characterize the membrane with respect to its breaking force and elongation at break, the membrane is elongated at ambient temperature at a constant rate until it breaks, and the force required therefore is determined along with the change in length.

Determination of the Average Diameter of the Pores in the Separation Layer:

The determination of the average diameter of the pores in the separation layer is performed using an image-analysis technique. For this purpose, the pores are assumed to have a circular cross-section. The average pore diameter is then the arithmetic mean of all visible pores on a membrane surface of approx. 8 µm×6 µm at 60000×magnification.

EXAMPLE 1

36.6% by weight poly(4-methyl-1-pentene) (TPX DX845) was dissolved in a nitrogen atmosphere in a container with stirrer at a temperature of 260° C. in 63.4% by weight of a solvent system consisting of 70% by weight dioctyl adipate, which acts as a strong solvent for poly(4-methyl-1-pentene), 20% by weight glycerin triacetate, and 10% by weight castor oil, the latter acting as weak non-solvents for poly(4-methyl-1-pentene). After degassing the clear and homogeneous solution was fed with a gear pump to a hollow-fiber die with an annular-gap outside diameter of 1.2 mm, which had been heated to 248° C. and thereby a temperature above the demixing temperature, and extruded to form a hollow fiber. Nitrogen was metered into the lumen of the hollow fiber through the interior bore of the hollow-fiber die. After an air section of 5 mm, the hollow fiber passed through an approx. 1 m long spinning tube, through which glycerin triacetate, tempered to ambient temperature, flowed as a cooling medium. The hollow fiber, solidified as a result of the cooling process in the spinning tube, was drawn off from the spinning tube at a rate of 72 m/min, wound onto a spool, subsequently extracted with isopropanol, and then dried at approx. 120° C.

A hollow-fiber membrane resulted with an outside diameter of 365 µm and a wall thickness of 86 µm, for which no pores were observable on its exterior surface in a scanning-electron-microscopic (SEM) image even at 60000× magnification (FIG. 1), whereas the interior surface facing the lumen had an open-pored, network-like structure with approximately circular openings (FIG. 2). The sponge-like, open-pored, microporous support structure, which is covered by the approx. 0.2 µm thick separation layer, is evident in the fracture image of a surface of fracture perpendicular to the longitudinal axis of the hollow-fiber membrane (FIG. 3). For the membrane according to this example, a volume porosity of 57%, a $CO_2$ flow of 8.16 ml/(cm$^2$*min*bar), an $N_2$ flow of 1.24 ml/(cm$^2$*min*bar), and a gas separation factor $\alpha(CO_2/N_2)$ of 6.6 were determined. The membrane exhibited a plasma breakthrough time of more than 72 hours. After this time, the test was discontinued. With a breaking force of 85 cN and an elongation at break of 129%, the membrane was well suited to further textile processing.

EXAMPLE 2

Poly(4-methyl-1-pentene) was melted in an extruder stepwise at increasing temperatures ranging from 270° C. to 290° C. and fed continuously to a dynamic mixer using a gear pump. The solvent system, consisting of 70% by weight dioctyl adipate, 15% by weight glycerin triacetate, and 15% by weight castor oil was also fed via a dosing pump to the mixer, in which the polymer and the solvent system were processed together at a temperature of 290° C. to a homogeneous solution with a polymer concentration of 35% by weight and a solvent-system concentration of 65% by weight. This solution was fed to a hollow-fiber die with an annular-gap outside diameter of 1.2 mm and extruded above the phase separation temperature at 250° C. to form a hollow fiber. Nitrogen was used as the interior filler. After an air section of 5 mm, the hollow fiber passed through an approx. 1 m long spinning tube, through which the cooling medium, tempered to ambient temperature, flowed. Glycerin triacetate was used as the cooling medium. The hollow fiber, solidified as a result of the cooling process in the spinning tube, was drawn off from the spinning tube at a rate of 72 m/min, wound onto a spool, subsequently extracted with isopropanol, and then dried at approx. 120° C.

A hollow-fiber membrane was produced with an outside diameter of 411 µm, a wall thickness of 94 µm, and a porosity of 56.5% by volume. The outside of the membrane had a separation layer, whereby no pores were evident according to SEM examination of the exterior surface at a magnification of 60000×. For the membrane according to this example, a $CO_2$ flow of 6.21 ml/(cm$^2$*min*bar), an $N_2$ flow of 0.66 ml/(cm$^2$*min*bar), and a gas separation factor $\alpha(CO_2/N_2)$ of 9.4 were determined. The membrane exhibited a plasma breakthrough time of more than 72 hours. After this time, the test was discontinued.

EXAMPLE 3

A hollow-fiber membrane was produced as in example 2, whereby the solvent system was a mixture of 70% by weight dioctyl adipate, 20% by weight glycerin triacetate, and 10% by weight castor oil, and the cooling medium was a mixture of dioctyl adipate, glycerin triacetate, and castor oil in a ratio of 20:75:5% by weight. The polymer concentration of the solution was 37% by weight, and the die temperature 247° C.

Figures 4, 5, 6:
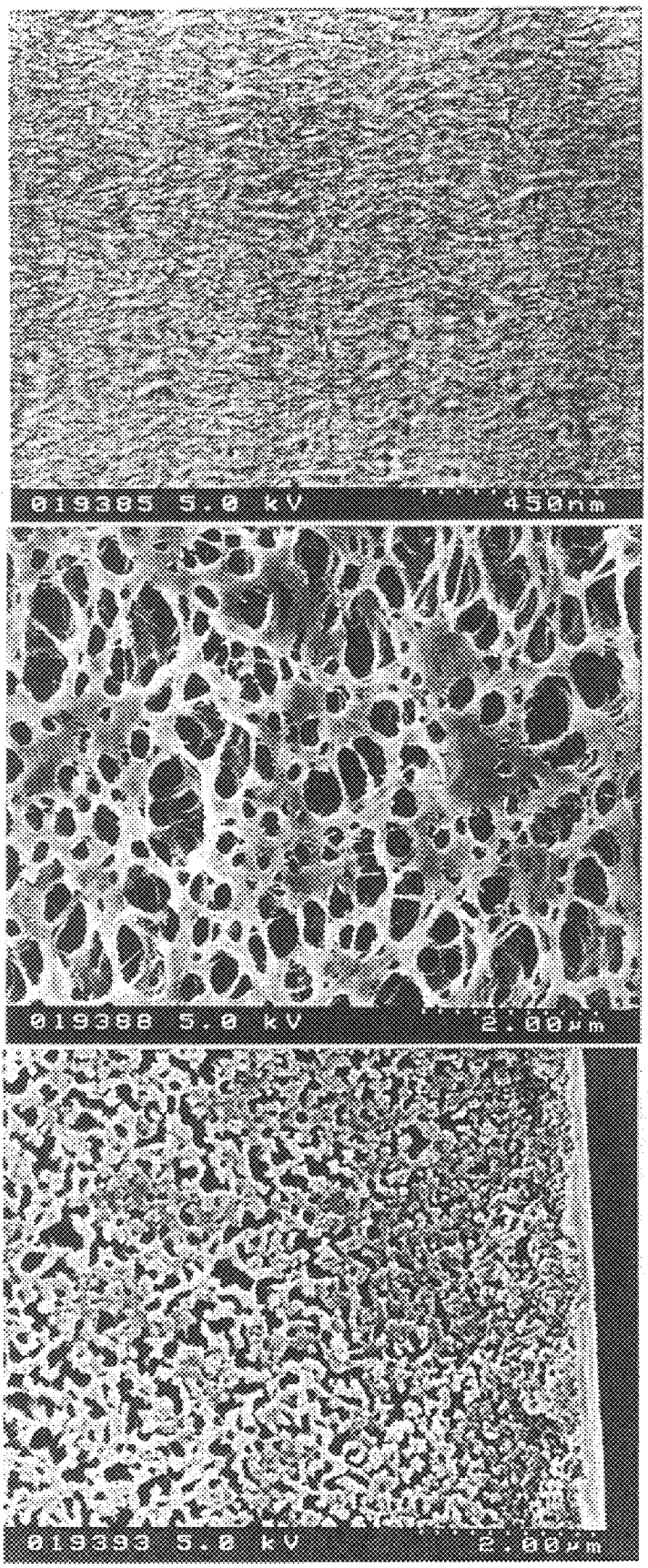
FIG. 4 shows an SEM image of the exterior surface of a hollow-fiber membrane according to example 2 at 60000× magnification.
FIG. 5 shows an SEM image of the interior surface of a hollow-fiber membrane according to example 2 at 13500× magnification.
FIG. 6 shows an SEM image of the surface of fracture perpendicular to the longitudinal axis of a hollow-fiber membrane according to example 2, in the vicinity of its outer side, at 13500×magnification.

A hollow-fiber membrane resulted with an outside diameter of 388 μm and a wall thickness of 97 μm, for which individual pores less than approx. 20 nm in size were observable on its exterior surface in a scanning-electron-microscopic (SEM) examination at 60000×magnification (FIG. 4). The interior surface facing the lumen had an open-pored, network-like structure with approximately circular openings (FIG. 5). A sponge-like, open-pored, microporous support structure, which was covered by a closed, approx. 0.2 μm thick separation layer, was evident in the fracture image of a surface of fracture perpendicular to the longitudinal axis of the hollow-fiber membrane (FIG. 6). For the membrane according to this example, a $CO_2$ flow of 53.41 ml/(cm$^2$*min*bar), an $N_2$ flow of 51.11 ml/(cm$^2$*min*bar), and a gas separation factor $\alpha(CO_2/N_2)$ of 1.05 were determined. The breaking force of the membrane was 92 cN and the elongation at break 132%. The membrane exhibited a plasma breakthrough time of more than 72 hours. After this time, the test was discontinued.

EXAMPLE 4

A hollow-fiber membrane was produced as described in example 2. The solvent system used was a mixture of 70% by weight dioctyl adipate, 15% by weight glycerin triacetate, and 15% by weight castor oil, and the cooling medium used was a mixture of 37.3% by weight dioctyl adipate, 48.2% by weight glycerin triacetate, and 14.5% by weight castor oil. The membrane according to this example, with an outside diameter of 390 μm and a wall thickness of 93.5 μm, had, similar to the membrane of example 1, as evidenced by the SEM images an exterior surface without pores and an interior surface facing the lumen with an open-pored, network-like structure with approximately circular openings. The sponge-like, open-pored, microporous support structure was covered by a closed, approx. 0.4 μm thick separation layer. The membrane had a plasma breakthrough time of 46 hours.

EXAMPLE 5

The procedure as in example 2 was followed. The solvent system used was a mixture of 80% by weight dioctyl adipate and 20% by weight castor oil, and the cooling medium was glycerin triacetate. The die temperature was 240° C.

Figures 7, 8, 9:
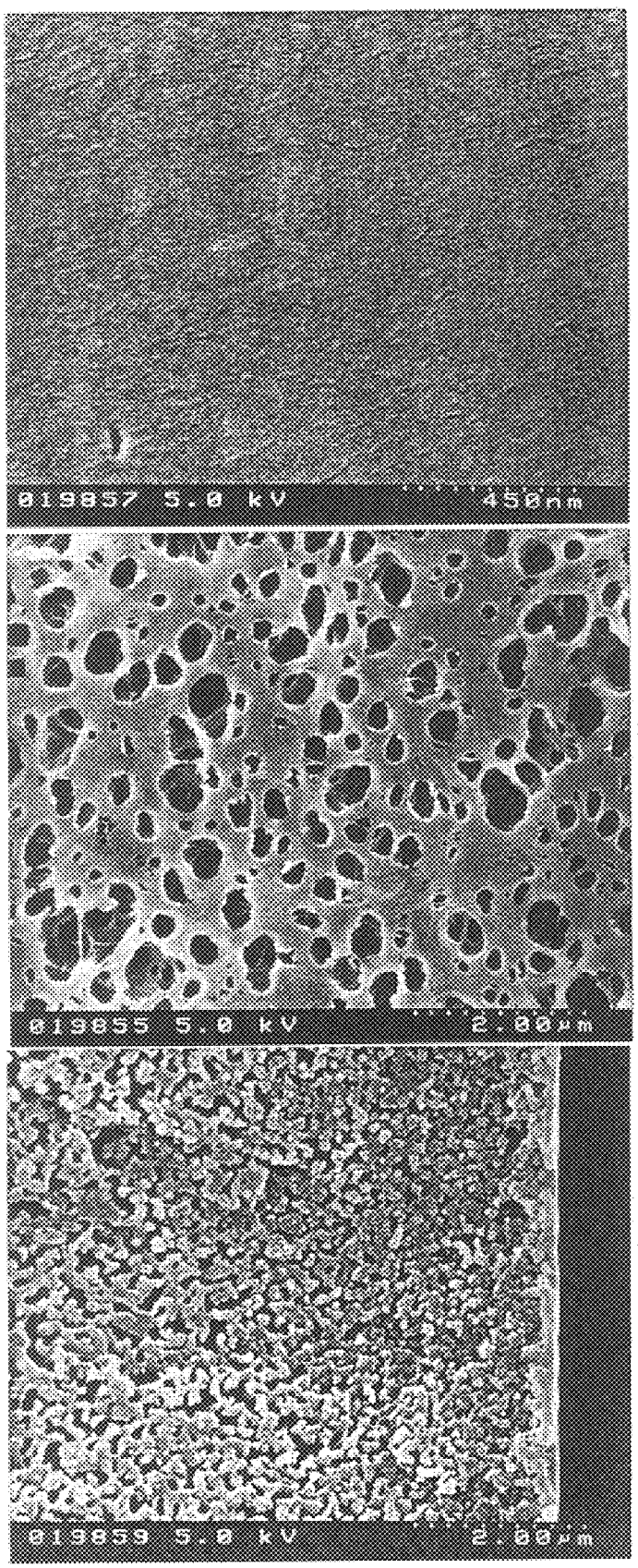
FIG. 7 shows an SEM image of the exterior surface of a hollow-fiber membrane according to example 5 at 60000× magnification.
FIG. 8 shows an SEM image of the interior surface of a hollow-fiber membrane according to example 5 at 13500× magnification.
FIG. 9 shows an image of the surface of fracture perpendicular to the longitudinal axis of a hollow-fiber membrane according to example 5, in the vicinity of its outer side, at 13500×magnification.

The membrane had on its exterior surface isolated pores with sizes up to approx. 50 nm (FIG. 7). The interior surface facing the lumen had an open-pored, network-like structure with approximately circular openings (FIG. 8). The sponge-like, open-pored, microporous support structure was covered by a closed, approx. 0.2 μm thick separation-layer (FIG. 9). The membrane had an inside diameter of 209 μm, a wall thickness of 90 μm, a breaking force of 96 cN, an elongation at break of 123%, a $CO_2$ flow of 42.64 ml/(cm$^2$*min*bar), and a gas separation factor $\alpha(CO_2/N_2)$ of 1. The plasma breakthrough time was more than 72 hours. After this time, the test was discontinued.

EXAMPLE 6

The procedure as in example 2 was followed. The solvent system was a mixture of 75% by weight isopropyl myristate, acting as a strong solvent, and 25% by weight castor oil, and the cooling medium was glycerin triacetate. The die temperature was 220° C.

The membrane had on its exterior surface individual pores with sizes up to approx. 50 nm. The support structure was covered by a closed, approx. 0.2 μm thick separation layer. The plasma breakthrough time exceeded 72 hours.

EXAMPLE 7

The procedure as in example 2 was followed, whereby the solvent system was a mixture of 70% by weight dioctyl adipate, 20% by weight glycerin triacetate, and 10% by weight castor oil, and the cooling medium was a mixture of 65% by weight glycerin and 35% by weight water. In this case, the cooling medium was not miscible with the solvent system. The die temperature was 235° C., and the air gap 20 mm.

Figures 10, 11, 12:
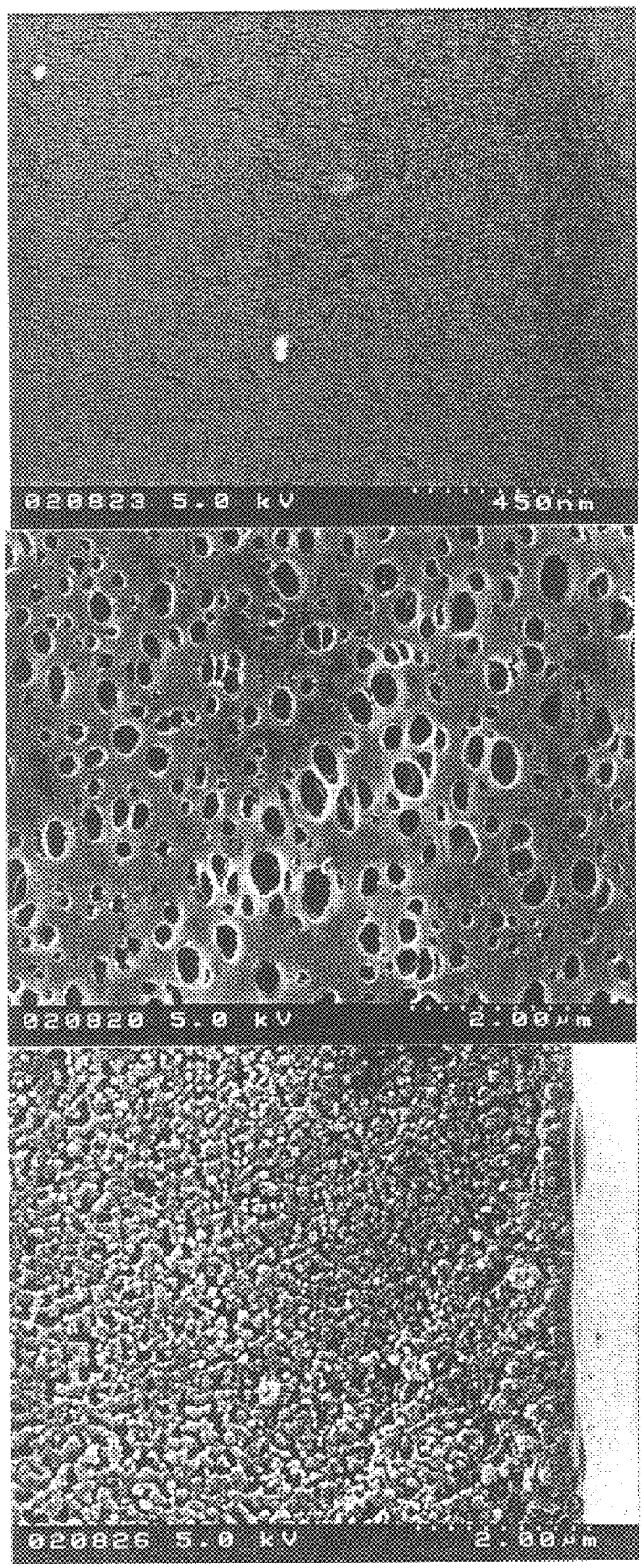
FIG. 10 shows an SEM image of the exterior surface of a hollow-fiber membrane according to example 7 at 60000× magnification.
FIG. 11 shows an SEM image of the interior surface of a hollow-fiber membrane according to example 7 at 13500× magnification.
FIG. 12 shows an SEM image of the surface of fracture perpendicular to the longitudinal axis of a hollow-fiber membrane according to example 7, in the vicinity of its outer side, at 13500×magnification.

The resulting hollow-fiber membrane had an inside diameter of 203 μm, a wall thickness of 90 μm, and a porosity of 57% by volume. The membrane exhibited a $CO_2$ flow of 13.17 ml/(cm$^2$*min*bar), an $N_2$ flow of 2.98 ml/(cm$^2$*min*bar), and a separation layer on its exterior surface with a gas separation factor $\alpha(CO_2/N_2)$ of 4.42. For the membrane according to this example, in the scanning-electron-microscopic examination, no pores were observable on its exterior surface even at 60000×magnification (FIG. 10), whereas the interior surface facing the lumen had an open-pored, network-like structure with approximately circular openings (FIG. 11). A sponge-like, open-pored, microporous support structure, covered by a very thin, approx. 0.1 μm thick separation layer, was evident in the fracture image of a surface of fracture perpendicular to the longitudinal axis of the hollow-fiber membrane (FIG. 12). Plasma breakthrough times exceeding 72 hours were determined.

COMPARATIVE EXAMPLE 1

A membrane was produced as in example 2, whereby the solvent system was a mixture of 80% by weight dioctyl adipate and 20% by weight castor oil. The resulting solution contained 47% by weight poly(4-methyl-1-pentene). The die temperature was 248° C. and thereby above the demixing temperature. The cooling medium used was dioctyl adipate tempered to ambient temperature, i.e., the same compound that served as compound A, i.e., as a solvent.

Figure 13:
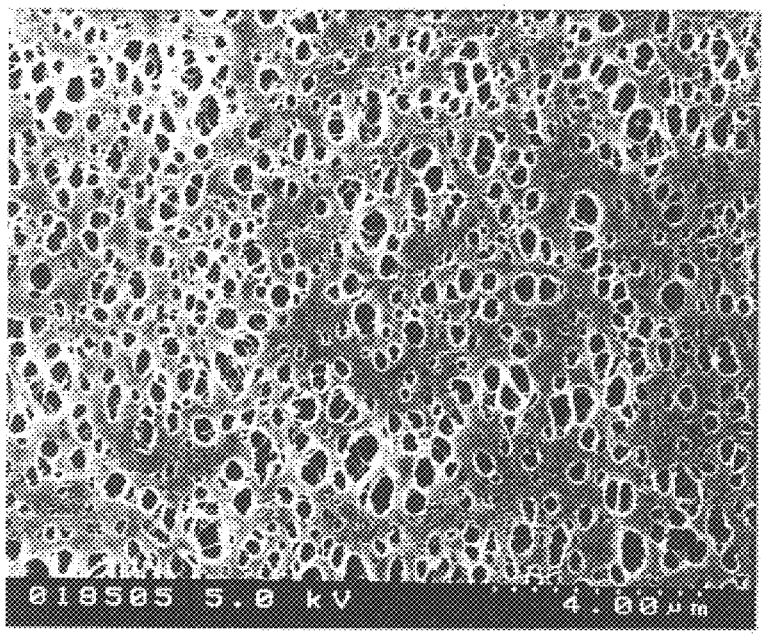
FIG. 13 shows an SEM image interior surface of a hollow-fiber membrane according to comparative example 1 at 6000×magnification.
Figure 14:
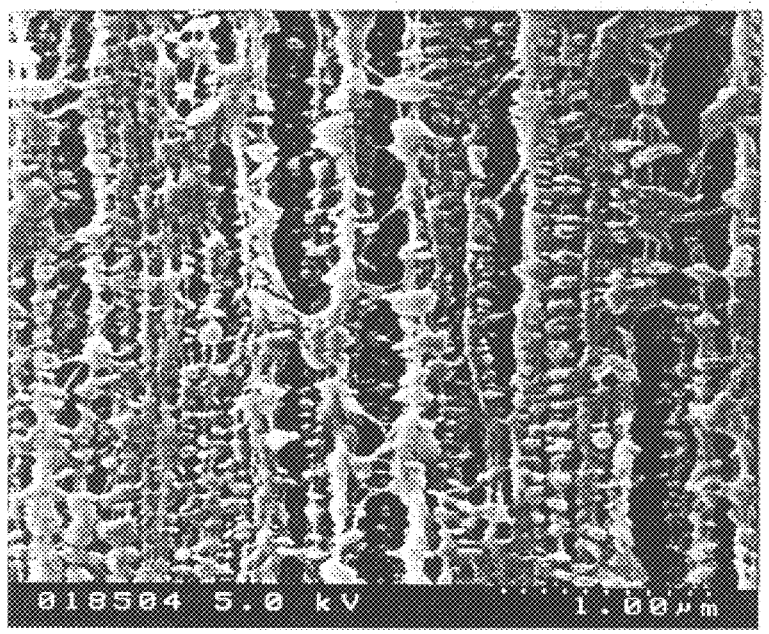
FIG. 14 shows an SEM image of the exterior surface of a hollow-fiber membrane according to comparative example 1 at 27000×magnification.

The finished membrane had an outside diameter of 390 μm, a wall thickness of 97 μm, and a porosity of 45% by volume. As evidenced by the SEM images, the exterior surface of the membrane was open-pored with numerous pores larger than 0.1 μm (FIG. 14). The interior surface facing the lumen was open-pored with approximately circular pores (FIG. 13). The membrane exhibited a $CO_2$ flow of 17.54 ml/(cm$^2$*min*bar), an $N_2$ flow of 20.30 ml/(cm$^2$*min*bar), and a gas separation factor $\alpha(CO_2/N_2)$ of 0.86.

COMPARATIVE EXAMPLE 2

A membrane was produced as in example 2, whereby the solvent system was a mixture of 90% by weight isopropyl myristate and 10% by weight castor oil. The polymer fraction in the resulting solution was 47% by weight. The die temperature was set at 248° C. The cooling medium was a mixture of 80% by weight dioctyl adipate and 20% by weight castor oil, tempered to ambient temperature, whereby the cooling medium was a solvent with respect to the polymer component poly(4-methyl-1-pentene).

Figure 15:
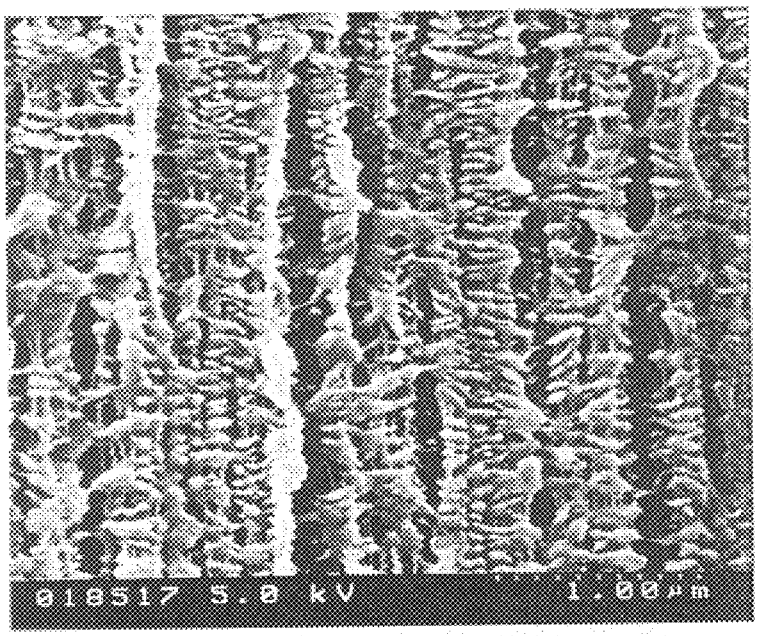
FIG. 15 shows an SEM image of the exterior surface of a hollow-fiber membrane according to comparative example 2 at 27000×magnification.
Figure 16:
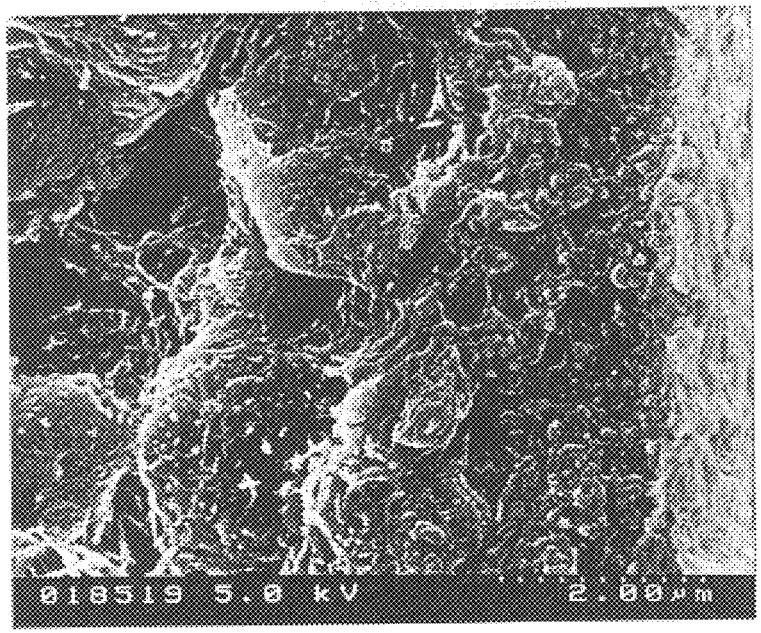
FIG. 16 shows an SEM image of the surface of fracture perpendicular to the longitudinal axis of a hollow-fiber membrane according to comparative example 2, in the vicinity of its outer side, at 13500×magnification.

The membrane according to this comparative example had an outside diameter of 390 µm, a wall thickness of 97 µm, and a porosity of approx. 45% by volume. As evidenced by the SEM images, the exterior surface of the membrane was open-pored with numerous pores larger than 100 nm (FIG. 15). The adjacent support structure had a pronounced particle structure, and sponge-like, porous structures were not evident (FIG. 16). The membrane exhibited a $CO_2$ flow of 138 ml/($CM^2$*min*bar), an $N_2$ flow of 150 ml/($cm^2$*min*bar), and a gas separation factor $\alpha(CO_2/N_2)$ of 0.92.

COMPARATIVE EXAMPLE 3

A solution was prepared containing 44% by weight polypropylene and 56% by weight of a solvent system consisting of 75% by weight soybean oil as compound A and 25% by weight castor oil as compound B, whereby soybean oil is not classifiable as a strong solvent with respect to polypropylene. The solution was extruded through a hollow-fiber die at 235° C., and the extruded hollow fiber, after passing an air gap of 5 mm in length, was directed through a spinning tube containing a cooling medium consisting of 75% by weight soybean oil and 35% by weight castor oil, i.e., the same combination also used as the solvent system.

This solution was extruded through a hollow-fiber die with a 0.3 mm wide annular gap to form hollow fibers. Nitrogen was used as the interior filler. The die had a temperature of 235° C. After an air section of approx. 5 mm, the hollow fibers passed through a 2 m long spinning tube, through which a cooling medium tempered to 40° C. flowed. The flow rate of the cooling medium was adapted to the spinning speed and was approx. 90 m/min. As a result of the cooling in the spinning tube, phase separation and solidification of the hollow filaments took place, so that they could be continuously drawn off from the spinning tube. Subsequently, the hollow filaments were extracted for 6 hours at 60° C. in isopropanol to remove the solvent system, and the resulting hollow-fiber membranes were then dried for 6 sec. at 120° C. A drawing of approx. 5% took place during drying.

The resulting hollow-fiber membranes according to this comparative example had an outside diameter of 375 µm, a wall thickness of 55 µm, and a volume porosity of 44.5% by volume. The outside of the membranes also had an open-pored structure with numerous pores larger than 0.1 µm in the exterior surface. The membrane exhibited a $CO_2$ flow of 49.25 ml/($cm^2$*min*bar), an $N_2$ flow of 56.45 ml/($cm^2$*min*bar), and a gas separation factor $\alpha(CO_2/N_2)$ of 0.87. As a result, the plasma breakthrough times of the membranes according to this comparative example are quite low at 3–5 hours, and the membranes are therefore not suitable for extended-duration use.

COMPARATIVE EXAMPLES 4 and 5

25% by weight poly(4-methyl-1-pentene) was dissolved at 255° C. in 75% by weight of a mixture of 90% by weight isopropyl myristate and 10% by weight glycerin monoacetate, i.e., in accordance with the definition of the present invention, a mixture of a strong solvent and a strong non-solvent. The homogeneous and clear solution, tempered to 255° C., was applied with a doctor blade to a glass plate maintained at ambient temperature, whereby the distance between the doctor blade and the glass plate was set to 250 µm. The cooled, porous polymer film was extracted with isopropanol and then dried at ambient temperature.

Figure 17:
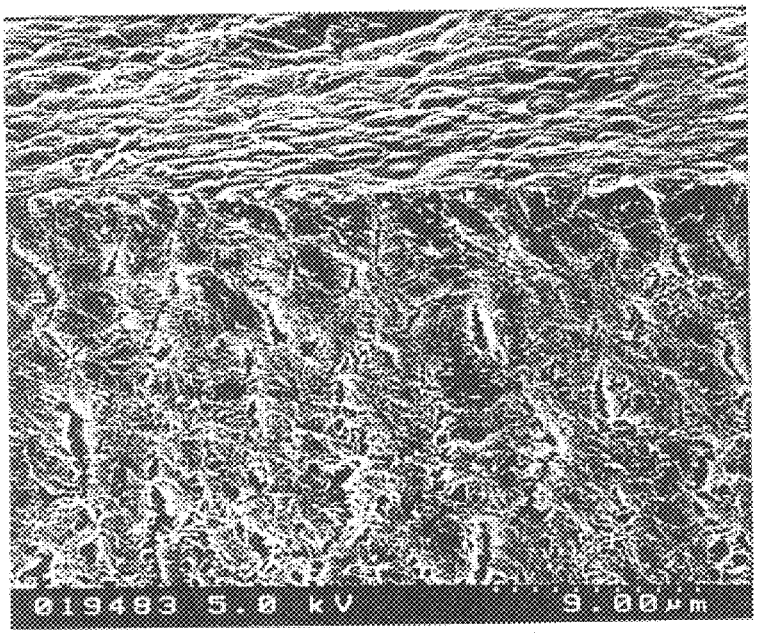
FIG. 17 shows an SEM image of a membrane according to comparative example 4 at 3000×magnification; fracture edge of the membrane between the membrane wall and the surface that was facing the glass side during membrane production.
Figure 18:
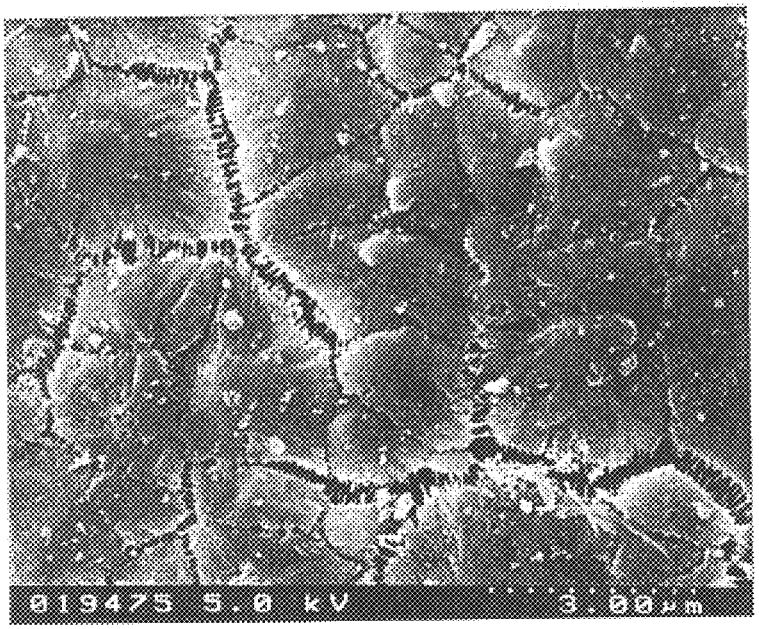
FIG. 18 shows an SEM image of a membrane according to comparative example 4 at 9000×magnification, showing the membrane surface that was facing the glass side during membrane production.

The resulting flat membrane had a pronounced compact and in part particle structure over its thickness, with intermediate pore channels (FIG. 17) that extend to the surface facing the glass side during production and there form pores in part exceeding 0.1 µm (FIG. 18). No separation layer was evident.

Figure 19:
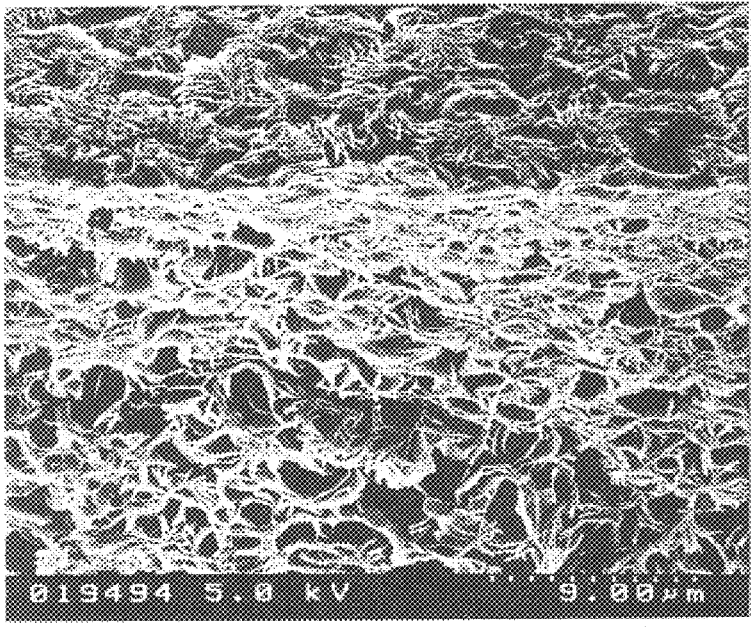
FIG. 19 shows an SEM image of a membrane according to comparative example 5 at 3000×magnification; fracture edge of the membrane between the membrane wall and the surface that was facing the glass side during membrane production.
Figure 20:
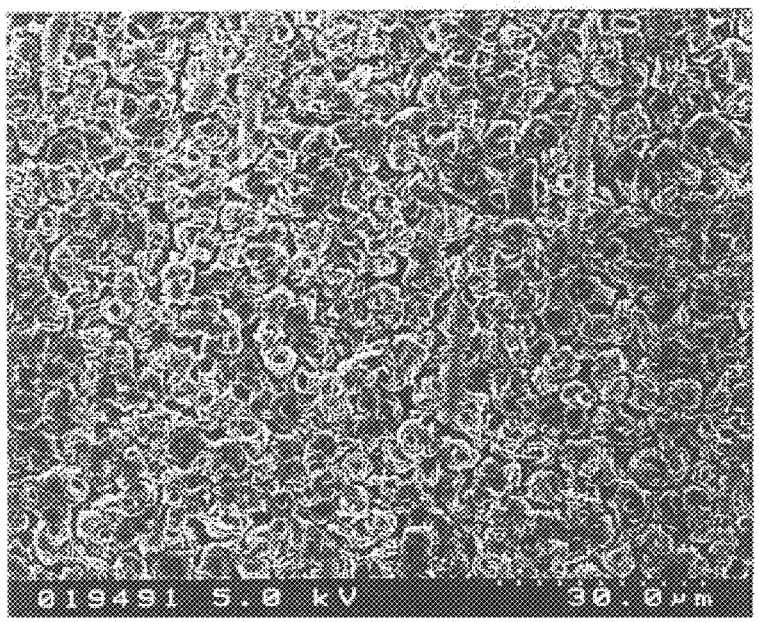
FIG. 20 shows an SEM image of a membrane according to comparative example 4 at 900×magnification, showing the membrane surface that was facing the glass side during membrane production.

When applying the polymer solution with a doctor blade to a glass plate heated to 100° C., open-pored structures resulted in the area of the membrane wall. However, a separation layer is also not evident in the SEM image of the fracture edge, whereby the SEM image depicts the fracture edge between the membrane wall and the surface that was facing the glass side during membrane production (FIG. 19). This surface is clearly open-pored, with pores in the micrometer range (FIG. 20).

What is claimed is:

1. Hydrophobic integrally asymmetrical membrane comprising: at least one polyolefin polymer; wherein the membrane comprises a support layer having a sponge-like, open-pored, microporous structure and, adjacent at least one of a first surface and a second surface of the support layer, a separation layer with denser structure; wherein the separation layer optionally has pores with an average diameter <100 nm; wherein the support layer is free of macrovoids and the pores in the support layer are on average substantially isotropic; and wherein the membrane has a porosity in the range from greater than 30% to less than 75% by volume and a gas separation factor $\alpha(CO_2/N_2)$ of at least 1.

2. Membrane according to claim 1, wherein the separation layer is adjacent the first surface of the support layer and a surface of the membrane on an opposite side of the support layer from the separation layer has an open-pored, network-like structure with approximately circular openings.

3. Membrane according to claim 1, wherein the membrane structure changes abruptly in a transition from the separation to the support layer.

4. Membrane according to claim 1, wherein the gas separation factor $\alpha(CO_2/N_2)$ is at least 2.

5. Membrane according to claim 1, wherein the separation layer has a thickness between 0.01 µm and 5 µm.

6. Membrane according to claim 5, wherein the separation layer has a thickness between 0.1 µm and 2 µm.

7. Membrane according to claim 1, wherein the porosity is in the range from greater than 50% to less than 75% by volume.

8. Membrane according to claim 1, wherein the membrane has a plasma breakthrough time of at least 20 hours.

9. Membrane according to claim 8, wherein the plasma breakthrough time is at least 48 hours.

10. Membrane according to claim 1, wherein the polyolefin consists of carbon and hydrogen.

11. Membrane according to claim 10, wherein the polyolefin is a poly(4-methyl-1-pentene).

12. Membrane according to claim 10, wherein the polyolefin is a polypropylene.

13. Membrane according to claim 10, wherein the membrane comprises a mixture of a poly(4-methyl-1-pentene) and a polypropylene.

14. Membrane according to claim 1, wherein the membrane has a gas flow $Q(CO_2)$ of at least 5 ml/$cm^2$·min·bar.

15. Membrane according to claim 1, wherein the membrane is a hollow-fiber membrane.

16. The membrane according to claim 1, wherein gas is transferred between the support layer and the separation layer.

17. The membrane according to claim 1, wherein oxygen is transferred from an oxygen side of the membrane to a blood side of the membrane.

18. Membrane according to claim 1, produced by a process for producing an integrally asymmetrical hydrophobic membrane having a sponge-like, open-pored, microporous support structure and a separation layer with a denser structure compared to the support structure, the process comprising:
   a) preparing a homogeneous solution of 20–90% by weight of a polymer component comprising at least one polyolefin in 80–10% by weight of a solvent system containing a compound A and a compound B that are liquid and miscible with each other at the dissolving temperature, wherein the solution of the polymer component, compound A and compound B has a critical demixing temperature and a solidification temperature and has a miscibility gap in a liquid state of aggregation below the critical demixing temperature, and wherein compound A comprises a solvent for the polymer component, and compound B raises a demixing temperature of a solution consisting of the polymer component and compound A,
   b) rendering the solution to form a shaped object, with a first surface and a second surface, in a die having a temperature above the critical demixing temperature,
   c) cooling the shaped object using a cooling medium, tempered to a cooling temperature below the solidification temperature, at such a rate that a thermodynamic nonequilibrium liquid-liquid phase separation into a high-polymer-content phase and a low-polymer content phase takes place and solidification of the high-polymer-content phase subsequently occurs when the temperature falls below the solidification temperature, and
   d) optionally removing compound A and compound B from the shaped object,
wherein compound A is a strong solvent for the polymer component, for which a demixing temperature of a solution of 25% by weight of the polymer component in this solvent is at least 10% below a melting point of the polymer component, wherein compound B is a weak non-solvent for the polymer component, which does not dissolve the polymer component to form a homogeneous solution when heated to a boiling point of compound B and for which a demixing temperature of a system consisting of 25% by weight of the polymer component, 10% by weight of the weak non-solvent, and 65% by weight of compound A, used as the solvent, is at most 8% above a demixing temperature of a system consisting of 25% by weight of the polymer component and 75% by weight of compound A, and wherein for the cooling, the shaped object is brought into contact with a solid or liquid cooling medium that does not dissolve the polymer component or react chemically with it at temperatures up to the temperature of the die.

19. Process for producing an integrally asymmetrical hydrophobic membrane having a sponge-like, open-pored, microporous support structure and a separation layer with a denser structure compared to the support structure, the process comprising:
   a) preparing a homogeneous solution of 20–90% by weight of a polymer component comprising at least one polyolefin in 80–10% by weight of a solvent system containing a compound A and a compound B that are liquid and miscible with each other at the dissolving temperature, wherein the solution of the polymer component, compound A and compound B has a critical demixing temperature and a solidification temperature and has a miscibility gap in a liquid state of aggregation below the critical demixing temperature, and wherein compound A comprises a solvent for the polymer component, and compound B raises a demixing temperature of a solution consisting of the polymer component and compound A,
   b) rendering the solution to form a shaped object, with a first surface and a second surface, in a die having a temperature above the critical demixing temperature,
   c) cooling the shaped object using a cooling medium, tempered to a cooling temperature below the solidification temperature, at such a rate that a thermodynamic nonequilibrium liquid-liquid phase separation into a high-polymer-content phase and a low-polymer content phase takes place and solidification of the high-polymer-content phase subsequently occurs when the temperature falls below the solidification temperature, and
   d) optionally removing compound A and compound B from the shaped object,
wherein compound A is a strong solvent for the polymer component, for which a demixing temperature of a solution of 25% by weight of the polymer component in this solvent is at least 10% below a melting point of the polymer component, wherein compound B is a weak non-solvent for the polymer component, which does not dissolve the polymer component to form a homogeneous solution when heated to a boiling point of compound B and for which a demixing temperature of a system consisting of 25% by weight of the polymer component, 10% by weight of the weak non-solvent, and 65% by weight of compound A, used as the solvent, is at most 8% above a demixing temperature of a system consisting of 25% by weight of the polymer component and 75% by weight of compound A, and wherein for the cooling, the shaped object is brought into contact with a solid or liquid cooling medium that does not dissolve the polymer component or react chemically with it at temperatures up to the temperature of the die.

20. Process according to claim 19, wherein the cooling medium is a liquid that is a non-solvent for the polymer component and does not dissolve the polymer component to form a homogeneous solution when heated up to a boiling point of the cooling medium.

21. Process according to claim 19, wherein the cooling medium is a liquid that is a strong non-solvent for the polymer component, for which the demixing temperature of a system consisting of 25% by weight of the polymer component, 10% by weight of the strong non-solvent, and 65% by weight of compound A, used as a solvent, is at least 10% higher than the demixing temperature of a system consisting of 25% by weight of the polymer component and 75% by weight of compound A.

22. Process according to claim 19, wherein the cooling medium is a homogeneous, single-phase liquid at the cooling temperature.

23. Process according to claim 19, wherein the cooling medium has a temperature that is at least 100° C. below the critical demixing temperature.

24. Process according to claim 19, wherein 30–60% by weight of the polymer component is dissolved in 70–40% by weight of the solvent system.

25. Process according to claim 19, wherein the at least one polyolefin consists of carbon and hydrogen.

26. Process according to claim 25, wherein the at least one polyolefin is a poly(4-methyl-1-pentene).

27. Process according to claim 26, wherein compound A comprises dioctyl adipate, isopropyl myristate, diphenyl ether, dibenzyl ether, or a mixture thereof.

28. Process according to claim 26, wherein compound B comprises glycerin triacetate, diethyl phthalate, castor oil, N,N-bis(2-hydroxyethyl)tallow amine, soybean oil, or a mixture thereof.

29. Process according to claim 25, wherein the at least one polyolefin is a polypropylene.

30. Process according to claim 29, wherein compound A comprises dioctyl adipate, isopropyl myristate, or a mixture thereof.

31. Process according to claim 29, wherein compound B comprises diethyl phthalate, glycerin triacetate, castor oil, glycerin diacetate, or a mixture thereof.

32. Process according to claim 25, wherein the at least one polyolefin is a mixture of a poly(4-methyl-1-pentene) and a polypropylene.

33. Process according to claim 19, wherein the membrane is a hollow-fiber membrane.

* * * * *

UNITED STATES PATENT AND TRADEMARK OFFICE
CERTIFICATE OF CORRECTION

PATENT NO.    : 6,497,752 B1
DATED         : December 24, 2002
INVENTOR(S)   : Erich Kessler et al.

It is certified that error appears in the above-identified patent and that said Letters Patent is hereby corrected as shown below:

<u>Column 4,</u>
Line 35, "highpolymer" should be -- high-polymer --.

<u>Column 11,</u>
Line 8, "openpored" should be -- open-pored --.

<u>Column 14,</u>
Line 28, "factor a" should be -- factor α --.
Line 61, "extendedduration" should be -- extended-duration --.

<u>Column 15,</u>
Line 38, "system-of" should be -- system of --.

<u>Column 16,</u>
Line 3, "polyolefin-with" should be -- polyolefin with --.

<u>Column 18,</u>
Line 64, "Were" should be -- were --.

Signed and Sealed this

Twenty-fifth Day of March, 2003

JAMES E. ROGAN
*Director of the United States Patent and Trademark Office*